UNITED STATES PATENT OFFICE.

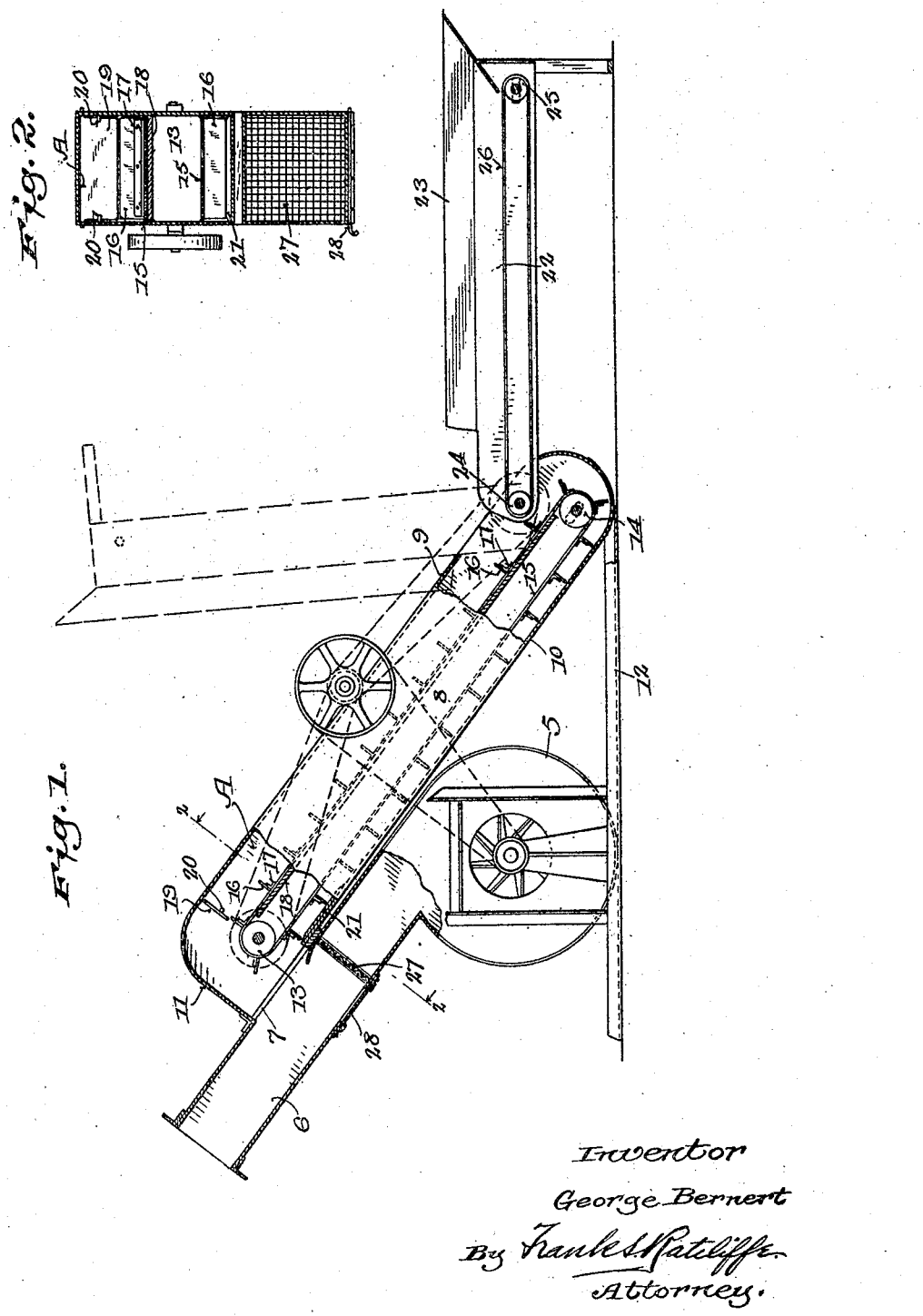

GEORGE BERNERT, OF MILWAUKEE, WISCONSIN, ASSIGNOR TO BERNERT MANUFACTURING COMPANY, OF MILWAUKEE, WISCONSIN, A CORPORATION OF SOUTH DAKOTA.

PNEUMATIC CONVEYER APPARATUS.

1,420,015.   Specification of Letters Patent.   Patented June 20, 1922.

Application filed May 20, 1920. Serial No. 382,746.

*To all whom it may concern:*

Be it known that I, GEORGE BERNERT, a citizen of the United States, and resident of Milwaukee, in the county of Milwaukee and State of Wisconsin, have invented certain new and useful Improvements in Pneumatic Conveyer Apparatus; and I do hereby declare that the following is a full, clear, and exact description thereof.

My invention relates to new and useful improvements in pneumatic conveying apparatus of that type including means for feeding the material to be conveyed into the air duct against the conveying pressure of air therein.

I have heretofore employed a spiral conveyer to procure the feeding pressure of material and to effect its introduction into the air duct with a minimum loss of air from the duct, and this type of feeding mechanism has been found highly satisfactory when the material to be conveyed has its constituent particles of such fine granular nature as to fill the convolutions of the spiral conveyer.

I have discovered that a conveying pressure current of air is effective for conveying corn on the ear or other material having its particles of such size as to prohibit the use of a spiral conveyer and casing in effecting feeding pressure of such material. It is therefore primarily the object of my present invention to provide an arrangement for procuring a positive feeding action of ear corn or other bulky material to be conveyed into the pressure current of a conveying air duct, with a minimum loss of air incidental to such feeding operation.

A further object is to provide for the conveying of such large particle material in relatively great volume through a restricted path without danger of clogging.

With the above and other objects and advantages in view, my invention resides more particularly in the novel combination, formation and arrangement of parts hereinafter described and pointed out in the appended claims.

In the accompanying drawings

Figure 1 is a view partly in section and partly in side elevation of a pneumatic conveying apparatus embodying my invention;

Figure 2 is a sectional view taken on the plane indicated by line 2—2 of Figure 1.

Referring now more particularly to the accompanying drawings, 5 designates the usual blower fan casing of a pneumatic conveyer unit, and a conveying duct 6 communicates with and extends obliquely upward from said casing, being provided in its top with an inlet opening 7. A feeding conveyer casing is provided which communicates at its upper end with the opening 7, said casing comprising side walls 8, a top 9 and bottom 10 and having a forward end wall 11 located at the forward edge of the inlet opening 7. This casing is supported at one end on the air duct 6 and is inclined in correspondence with the inclination of the duct, the other end of the casing preferably resting on the base 12 which supports the fan, the lower end portion of the casing being open. A roller 13 is mounted transversely in the upper end portion of the casing and a second roller 14 is mounted transversely in the lower end portion of the casing, said rollers having their axes disposed below the center line of the casing. A belt 15 is trained about said rollers and carries flights formed in the present instance by strips 16 secured transversely to the belt by angle-iron bracket sections 17. The flight strips are of such width with relation to the diameters of the belt rollers 13 and the distance of their axes from the center of the casing, that the flights on the lower stretch of the belt ride immediately adjacent the bottom 10 of the casing, while the flights at the upper stretch of the belt are spaced a considerable distance from the top 9 of the casing and hence an enclosed space is provided above the belt conveyer for the material to be conveyed. The upper stretch of the belt rides on a transverse partition plate 18 carried by the casing walls 8 and extending between the belt rollers. It is thus seen that the conveyer casing proper is defined by the partition wall 18 and the upper portion of the main casing forming an elongated chamber A above the conveyer flights. Retrograde flow of air through the chamber A is retarded by a valve plate 19 pivoted in the present instance to the upper end portion of the casing top 9 and urged to closing position against a suitable stop 20, holding the valve substantially at right angles to the casing and intersected by the major axis of the casing proper. In the conveying action, the corn cobs or other bulky objects conveyed would be massed in the space A and the conveying pressure of the flights would be exerted through the mass of material conveyed directly against the valve to open the same without undue pressure. It is noted that the conveyer flights in their travel about the upper roller 13 are spaced a distance from the end 11 of the casing which is substantially equal to the distance which said flights are spaced from the casing top 9 to provide the chamber A whereby the material conveyed may freely pass about the upper end of the conveyer, into the air duct, and it is noted that the conveyer flights in passing about the roller 13 will exert a positive centrifugal action on the constituent particles of the material conveyed, tending to throw said particles into the air duct and thus overcome the tendency of back pressure flow of air to hold said particles against the conveyer belt whereby said particles might tend to clog against the lower edge of the inlet opening 7 of the duct.

By enclosing the belt conveyer and providing the chamber A above its upper flight, a free travelway is provided for ears of corn or other material having constituent particles which possess similar difficulties of handling by reason of their awkward shape, whereby the possibility of clogging is prevented and whereby a maximum retarding action is effected with respect to the amount of air which will unavoidably find its way past valve means associated with the upper portion of the conveyer, by reason of the mass of material filling the chamber A in the conveying operation, this mass of material being carried along in the chamber A by the engagement of its lower particles with the flights of the conveyer and the continuous conveying movement of a relatively large mass of material is thus readily effected. At the lower stretch of the conveyer, the flights engage against a raised casing portion 21 adjacent the inlet opening 16 of the duct, to prevent back pressure flow of air through the lower portion of the casing, and beyond said portion 21 the flights are preferably free from the casing to avoid friction.

Material to be conveyed may be supplied in any manner to the lower portion of the feeder casing, and in the present instance I provide an elongated hopper trough having side walls 22 which are flared at their upper edges at 23 and which have their inner end portions pivotally mounted on the shaft of a conveyer belt roller 24 which extends between the lower portions of the casing walls 8. A roller 25 is mounted in the outer portion of the hopper trough and a belt 26 is trained about said rollers 24 and 25 and forms the bottom of the trough whereby material dumped therein will be conveyed to the feeder casing and thence into the air duct. The hopper trough may be swung upwardly on the roller shaft, shown in dotted lines, and the hopper is adapted to swing under a wagon to unload the same.

A screen 27 of very coarse mesh is disposed across the air duct immediately below the feed inlet opening 7 thereof. This screen does not interfere with the passage of air through the duct, but prevents ears of corn or other objects from dropping back into the fan upon reduction of the air current and a slide 28 is mounted in the bottom of the duct adjacent the screen for cleaning out the duct upon accumulation of objects against the screen.

While I have shown and described a preferred embodiment of my invention, it will be understood that various changes and modifications of structure may be employed to meet differing conditions of use and manufacture without departing in any manner from the spirit of my invention, and while I have shown the belt 15 as formed of canvas or similar material extending in the present instance entirely across the feed conveyer casing, this term will apply equally to any endless flexible member operative to carry the flights 16 for the conveying action.

What is claimed is:

1. A pneumatic conveying apparatus including a conveying air duct, a feeding conveyer casing communicating at one end portion with said air duct, rollers in the end portions of said casing having their axes disposed below the center of the casing, a conveyer belt trained about said rollers and conveying flights on said belt, the flights on the upper stretch of the belt being spaced from the top of the casing to provide a conveying chamber, and a valve in said casing yieldable upon engagement therewith of material to be conveyed.

2. A pneumatic conveying apparatus including an air duct, means for procuring a pressure conveying current of air in said duct, a feeding conveyer casing communicating at one end portion with said air duct, rollers in the end portions of said casing, a conveyer belt trained about said rollers, and conveying flights on said belt, said conveying flights exerting centrifugal action on the material conveyed thereby in passing about the roller at the duct communicating end portion of the casing whereby to exert centrifugal action on the material conveyed to impel said material into the air duct against conveying pressure of air therein.

3. A pneumatic conveying apparatus including a conveying air duct, a feeding conveyer casing communicating at one end portion with said air duct, an endless conveyer belt extending in said conveyer casing, conveying flights on said belt, the flights on the upper stretch of the belt being spaced from the top of the casing to provide a conveying chamber, valve means for retarding flow of air in said chamber yieldable upon engagement therewith of material to be conveyed, and a partition plate extending across the chamber below the upper stretch of said conveyer belt and supporting said upper stretch.

4. A pneumatic conveying apparatus including a conveying air duct, a feeding conveyer casing connected with said air duct, an endless conveyer belt extending in said duct, conveying flights on said belt, the space at the upper stretch of the belt forming a conveying chamber, means for retarding flow of air in said chamber, and means, independent of said means for retarding flow of air in the conveyer casing, for retarding flow of air in that part of the conveyer casing between the lower stretch of the conveyer belt and the casing bottom wall.

5. A pneumatic conveying apparatus including a conveying air duct, a feeding conveyer casing communicating at one end portion with said air duct, an endless conveyer belt extending in said conveyer casing, conveying flights on said belt, the flights on the upper stretch of the belt being spaced from the top of the casing to provide a conveying chamber, valve means for retarding flow of air in said chamber yieldable upon engagement therewith of material to be conveyed, and a raised portion on the bottom of the casing adjacent its point of communication with the air duct engageable with the flights of the lower stretch of the conveyer belt.

6. A pneumatic conveying apparatus including a conveying air duct, an upwardly inclined feeding conveyer casing communicating at its upper end with said duct, rollers in the end portions of said casing having their axes disposed at one side of the center of the casing, a conveyer belt trained about said rollers, conveying flights on said belt, the flights on the upper stretch of the belt being spaced from the top of the casing to provide a conveying chamber, a roller carried by the sides of the feeding conveyer casing immediately above the lower end portion of the upper stretch of the conveyer belt, a hopper pivoted concentric with said last named roller, a roller carried by the outer portion of the hopper, and a second conveyer belt trained about the two last named rollers.

In testimony that I claim the foregoing I have hereunto set my hand at Milwaukee, in the county of Milwaukee and State of Wisconsin.

GEORGE BERNERT.